April 21, 1953     H. G. THOMPSON ET AL     2,635,355
EDUCATIONAL ENUMERATION BLOCK ASSEMBLY
Filed Jan. 8, 1951
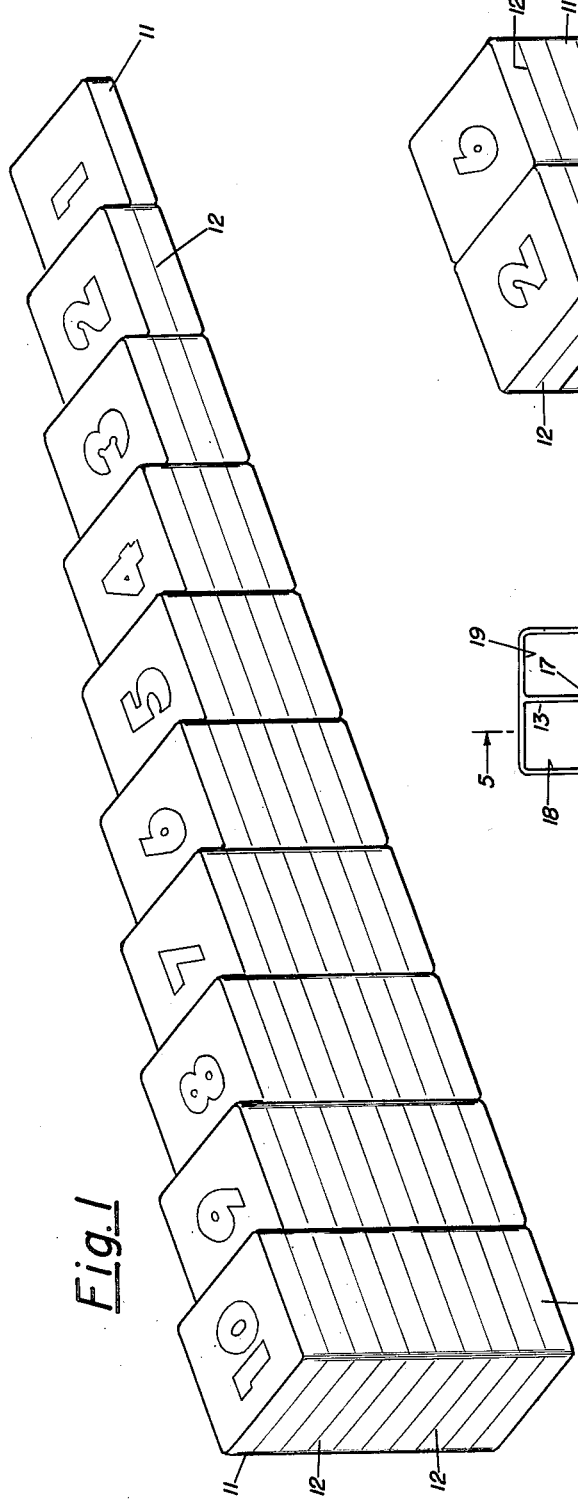
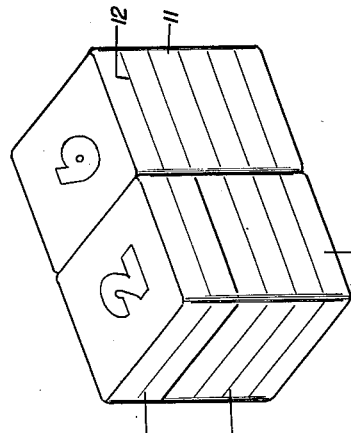
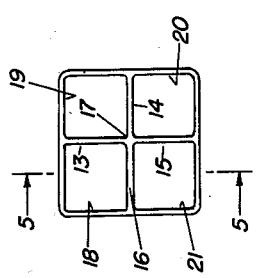
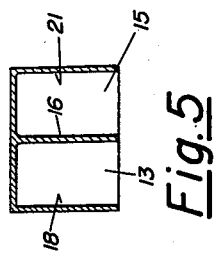
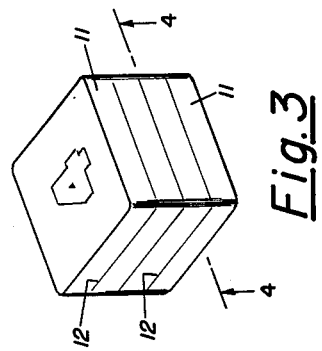
INVENTORS
HOWARD G. THOMPSON
HELEN L. THOMPSON
BY
Everett N. Curtis

Patented Apr. 21, 1953

2,635,355

UNITED STATES PATENT OFFICE 2,635,355

EDUCATIONAL ENUMERATION BLOCK ASSEMBLY

Howard G. Thompson and Helen L. Thompson, San Diego, Calif.

Application January 8, 1951, Serial No. 205,006

4 Claims. (Cl. 35—31)

Our invention relates to educational enumeration block assemblies, particularly as employed in the teaching objectively of arithmetic to the young; and its objects are to develop and nourish readiness in children in the understanding of numerical values, beginning with simple recepts at an early age of the growth of the child and at his level of mentality, and with the continuance of said growth and increasing intelligence, gradually to accomplish in him a better understanding of the science of numbers; to alert, cultivate and train the powers of observation of the child and attract his interest by visual addition, subtraction, multiplication and division brought about through the use of a novel construction and co-operative arrangement of blocks specially designed for the purpose; to afford a systematic educational means for teaching arithmetic to children by the use of said blocks and cultivated recognition of numerical combinations through manipulation thereof; to furnish a novel co-ordinating assembly of specially formed numbered hollow blocks, having reinforced walls, and being distinguishable one from the other through unitary divisions indicated thereon, but permitting stacking uniformly and numerically in accordance with said divisions; to interest the child in the blocks as a form of play and to encourage him in the application of numbers in grouping and arranging the blocks in recognition of their numerical unit values; and in general to provide an enumerated block assembly for children educational in character and economical and sturdy in construction, efficient in the development of number perception, and of prolonged life and utility. These and other objects will appear from the accompanying drawing and as hereinafter more particularly set forth and described.

Our invention particularly consists in an assembly of specially constructed light weight hollow blocks, each composed of recognizable divisions uniform in shape and character, and preferably numbered in accordance with said units, and each preferably reinforced from within by braces radiating from the center and contacting the walls thereof; the said blocks being adapted to be piled in stacks to form desired arithmetical combinations.

Our invention further consists in novel features of construction and combinations and arrangements of elements and parts illustrated in the drawing and hereinafter more specifically referred to and claimed.

Attention is hereby directed to the accompanying drawing, illustrating a preferred form of our invention, in which similar numerals of designation refer to similar parts throughout the several views, and in which, Figure 1 is an isometric representation of a set of numbered blocks embodying our invention, showing each block scored to indicate units of uniform shape and character, and the number of said units conforming to the indicated number on the block;

Fig. 2 is an isometric representation of an example of one of the many combinations to be effected through the piling of the blocks, such example showing the visual combination and grouping of the blocks numbered 2 and 4 to effect the total of 6;

Fig. 3 is an isometric representation of the block numbered 4, the form and construction of which is typical of each of the blocks;

Fig. 4 is a view of the open bottom of block 4 shown in Fig. 3, looking upwardly in the direction indicated by the arrows, and showing the form of bracing preferably employed by us for stiffening the walls of said block, and Fig. 5 is a sectional view of Fig. 4, looking in the direction indicated by the arrows.

Referring to the drawing, each of the numbered blocks of the set illustrated in Fig. 1, is an exact multiple in size and shape of the unit section 11, corresponding to block numbered 1 of said set, which in its entirety constitutes a single separate unit section. This section 11 is a prism, preferably square, rectangular or cylindrical in form, and is low in height compared with the rest of the block. Where a square unit is used, we find that a convenient size is about two inches in length and breadth and about three-eighths of an inch in thickness; but as is obvious such dimensions may be changed and adapted as occasion requires. Using the unit section as a basis, each numbered block is in thickness expressed by its number the sum of the thickness of its piled multiple sections, and the number of such sections is also indicated on each block to the eye and sense of touch by divisional scoring 12 of the walls thereof. Thus, block 2 is in form, a combination of two of said unit sections piled one upon the other, and having double the thickness thereof, the line of division between said units being shown by the horizontal line of scoring 12 extending circumferentially around the outer faces of the block. So, also, block 3 is similarly a piled combination of three of said sections, and each of the blocks 4 to 10 is a piled combination of said sections corresponding to the numbers on these blocks.

Preferably the blocks are shaped and numbered to form an assembly 1 to 10 as shown in the drawing, but if desired such assembly could be greater or less in number, and there could be employed a number of such assemblies. To secure lightness and economy in the use of material, each of said blocks is made with an open bottom and is preferably hollow in character, and has its walls made comparatively thin, such walls being reinforced and stiffened inside of the block through the provision of braces 13, 14, 15 and 16, radiating spider-like from a common center 17 and having their ends firmly secured at a right angle to the adjacent portions of the said walls. As shown in Fig. 3, each of these braces is a flat strip of material extending from the bottom of the block upwardly to the top thereof to which it is securely affixed, the arrangement being such that each block is thereby made cellular in construction, forming the cells 18, 19, 20 and 21, and resulting in a rigid and sturdy block capable of withstanding the rough usage to which it may be put.

The substance from which the said blocks and parts thereof are formed is plastic, but may be of any suitable material. Also to aid the child in further distinguishing the blocks one from the other, identifying colors may be used. For the purpose of piling the blocks, we preferably construct each of the same with flat tops and open bottoms, so as to enable the child or his teacher readily to pile and manipulate the same in effecting desired visual arithmetical combinations and arrangements.

In teaching the science of numbers to the young, our improved block assembly is capable of a wide range of numerical applications and demonstrations. For addition, using the block 10 as an example, there could be set side by side of said block, and at the same height, the blocks 2 and 8 piled one upon the other, block 3 piled upon block 7; and block 4 piled upon block 6. For subtraction, the blocks so arranged could be objectively diminished. For multiplication and division, combinations of blocks from a number of sets as shown in the drawing could be used.

Where in the specification and claims the words "score," "scored" or "scoring" are used, we desire to be understood as using the said words in their primary dictionary sense as referring to a "notch or incision" which is perceptible to the sense of touch as well as to the sense of sight.

Our invention may be embodied in other specific forms without departing from the spirit or essential characteristics thereof. The present embodiments, as above set forth are therefore to be considered in all respects as illustrative and not restrictive, the scope of our invention being indicated by the appended claims rather than by the foregoing description, and all changes which may come within the meaning and range of equivalency of the claims are therefore intended to be embraced therein.

What we claim and desire to secure by Letters Patent is:

1. An educational enumeration block assembly, comprising a set of light weight thin walled hollow blocks, each of which is formed of unit divisions of the same size, and each of which is scored to indicate the number of divisions thereof, and means radiating from the center for bracing the walls of each of said blocks.

2. An educational enumeration block assembly, comprising a set of sequentially numbered light weight hollow blocks with open bottoms, each of which is formed of unit divisions of the same size corresponding in number to the number of the block, and each of which is scored to indicate the number of divisions thereof, and cellular means for bracing the walls of each of said blocks.

3. An educational enumeration block assembly, comprising a set of sequentially numbered light weight thin walled hollow blocks, each of which is formed of unit divisions of the same size corresponding to the number of the block and each of which is scored to indicate the number of divisions thereof; and spider-like bracing means for each block consisting of flat strips radiating from a common center within said block and coextensive with the walls thereof, said strips being firmly secured to the adjacent walls of said block and adapted to hold and maintain said walls in rigid relative position one with the others.

4. An educational enumeration block assembly, comprising a set of numbered light weight hollow blocks with open bottoms, each of which is formed of unit divisions of the same size corresponding to the number of the block and each of which is circumferentially marked to indicate to the eye and by sense of touch the divisions thereof; and spider-like bracing means for each block consisting of strips radiating from a common center within said block, said strips being firmly secured at right angles to the adjacent walls of said block and adapted to hold and maintain said walls in rigid relative position one with the others.

HOWARD G. THOMPSON.
HELEN L. THOMPSON.

References Cited in the file of this patent

UNITED STATES PATENTS

| Number | Name | Date |
|---|---|---|
| 167,030 | Smith | Aug. 24, 1875 |
| 850,490 | Price | Apr. 16, 1907 |
| 1,151,279 | Lewis | Aug. 24, 1915 |
| 1,428,206 | Benton | Sept. 5, 1922 |
| 1,471,437 | Wood | Oct. 23, 1923 |
| 1,594,376 | Passmore | Aug. 3, 1926 |
| 1,923,522 | Whitehouse | Aug. 22, 1933 |
| 2,386,114 | Hayes | Oct. 2, 1945 |
| 2,440,205 | McLain | Apr. 20, 1948 |
| 2,492,922 | McLain | Dec. 27, 1949 |
| 2,494,469 | Booth | Jan. 10, 1950 |
| 2,494,497 | Trapnell | Jan. 10, 1950 |
| 2,514,636 | Glaze | July 11, 1950 |
| 2,526,123 | Dawson | Oct. 17, 1950 |

FOREIGN PATENTS

| Number | Country | Date |
|---|---|---|
| 7,863 | Great Britain | Apr. 17, 1901 |